US008985917B2

(12) United States Patent
Koch et al.

(10) Patent No.: US 8,985,917 B2
(45) Date of Patent: Mar. 24, 2015

(54) CUTTING MACHINE FOR GEARS, SPLINES, AND OTHER SHAPES

(75) Inventors: Loyd L. Koch, Rockford, IL (US); Hans Grass, Rockford, IL (US); Wayne Densmore, Hendersonville, NC (US)

(73) Assignee: Bourn & Koch, Inc., Rockford, IL (US)

( * ) Notice: Subject to any disclaimer, the term of this patent is extended or adjusted under 35 U.S.C. 154(b) by 1267 days.

(21) Appl. No.: 12/764,701

(22) Filed: Apr. 21, 2010

(65) Prior Publication Data

US 2010/0290852 A1 Nov. 18, 2010

(51) Int. Cl.
*B23F 5/12* (2006.01)
*B23F 5/14* (2006.01)
*B23F 1/04* (2006.01)

(52) U.S. Cl.
CPC .... *B23F 5/14* (2013.01); *B23F 1/04* (2013.01)
USPC .................................. 409/46; 407/20; 409/58

(58) Field of Classification Search
CPC ................ B23F 1/00; B23F 1/04; B23F 1/06; B23F 1/08; B23F 5/12; B23F 5/125; B23F 5/20; B23F 5/28; B23F 9/003; B23F 9/04; B23F 9/08; B23F 21/04; B23F 21/12; B23F 21/24; B23F 21/26
USPC .......... 407/20, 21, 23, 26, 28, 29; 409/46, 58, 409/59, 10, 31, 280, 281, 286, 287
See application file for complete search history.

(56) References Cited

U.S. PATENT DOCUMENTS

| | | | |
|---|---|---|---|
| 3,628,359 A | 12/1971 | Tlaker | |
| 3,741,659 A | 6/1973 | Jones, Jr. | |
| 4,125,056 A * | 11/1978 | Tlaker et al. | 409/36 |
| 4,136,302 A | 1/1979 | Tlaker et al. | |
| 4,254,690 A | 3/1981 | Tlaker et al. | |
| 4,487,535 A * | 12/1984 | Johnson et al. | 409/60 |
| 4,533,858 A | 8/1985 | Tlaker | |
| 4,542,638 A | 9/1985 | Tlaker | |
| 4,629,377 A | 12/1986 | Tlaker et al. | |
| 4,673,317 A * | 6/1987 | Haug | 407/28 |
| 4,784,538 A | 11/1988 | Tlaker et al. | |
| 4,786,218 A * | 11/1988 | Feuser | 409/2 |
| 4,942,657 A | 7/1990 | Mihara et al. | |
| 5,052,867 A * | 10/1991 | Kramer | 409/244 |
| 5,066,897 A * | 11/1991 | Ueda et al. | 318/135 |
| 5,345,390 A * | 9/1994 | Greenip et al. | 700/175 |
| 7,097,399 B2 * | 8/2006 | Winfough et al. | 409/32 |
| 2005/0129474 A1* | 6/2005 | Winfough et al. | 409/36 |

FOREIGN PATENT DOCUMENTS

WO WO 2006/023529 A2 3/2006

* cited by examiner

*Primary Examiner* — Christopher M Koehler
(74) *Attorney, Agent, or Firm* — Reinhart Boerner Van Deuren P.C.

(57) ABSTRACT

A cutting machine for gear shaping or the like is provided. The cutting machine includes a gear shaping head. The gear shaping head has a ram that is guided by and reciprocates along a linear guide mounted between a saddle of the gear shaping head and the ram. At least one linear motor reciprocates the ram along a stroke axis relative to the saddle. The ram also carries a rotary drive and a spindle that reciprocate in unison with the ram. The rotary drive directly drives the spindle to journal the spindle through incremental angular positions during gear shaping.

7 Claims, 12 Drawing Sheets

CUTTING MACHINE FOR GEARS, SPLINES, AND OTHER SHAPES

FIELD OF THE INVENTION

This invention generally relates to automated machine tooling and more particularly to automated cutting machinery in which a reciprocating spindle is linearly reciprocated to drive a cutting tool relative to a workpiece.

BACKGROUND OF THE INVENTION

Gear shaping is a cutting process wherein a gear of a desired tooth profile with cutting capability can generate the similar tooth profile in a workpiece, i.e. a "blank", mounted on a work table. Gear shaping can be used to generate a tooth profile on the outer periphery of a workpiece, or the inner periphery of the workpiece. Additionally, gear shaping is particularly advantageous when shaping gears having a shoulder, i.e. a secondary flange, below the inner or outer periphery containing the tooth profile and in close proximity thereto.

As it relates to the general state of the art, reference can be had to U.S. Pat. Nos. 3,628,359; 4,136,302; 4,254,690; 4,533, 858; 4,542,638; 4,629,377; 4,784,538; 5,345,390; and 7,097, 399, the entire disclosures of which are also hereby incorporated by reference in their entireties. As can be generally appreciated from the above, gear shaping is a cutting process wherein a spindle fixedly carrying the cutting gear linearly and vertically reciprocates across the inner or outer periphery of the workpiece to successively cut the desired tooth profile. The cutting gear and workpiece also rotate relative to one another during cutting in the same manner that the finished gear would mesh with its mating gear during operation.

The linear reciprocation, i.e. stroking, of the spindle is typically accomplished by a conventional rotary motor and crankshaft linkage commonly referred to as the stroke drive. The rotary motion of the motor is converted to linear stroking motion by way of the crankshaft and linkage. The motor is typically statically mounted on a frame of the gear shaping machine, and the crankshaft and linkage are connected to the spindle.

The rotary motion of the spindle is also typically accomplished by a conventional rotary motor and linkage distinct from the stroke drive and commonly referred to as the rotary drive. This rotary motor is also statically mounted on a frame of the gear shaping machine in a like manner as the rotary motor providing linear reciprocation. The motor is mechanically linked to the spindle by the linkage, and is responsible for rotating the spindle to effectuate the desired rotary feed, i.e. meshing, of the cutting gear and the workpiece.

During a single stroke cycle, the spindle undergoes both linear and rotational motion. More specifically, the spindle is driven linearly toward the workpiece mounted on the work table during a cutting stroke by the stroke drive. After performing a cut, the cutting gear is then backed away from the workpiece in a back-off motion along a radial axis so as to not make contact with the workpiece during a return stroke. The spindle is then driven linearly away from the workpiece in a return stroke generally opposite the cutting stroke, also by the stroke drive. Generally, cutting does not occur during the return stroke. The cutting gear then moves along the radial axis in an opposite manner as the back-off stroke to then begin another stroke cycle. The spindle and the cutting gear rotate continuously during both the cutting and the return stroke by way of the rotary drive. Similarly, the work table and the workpiece continuously rotate during the cutting and return stroke by way of a work table drive.

Unfortunately, several problems arise as a result of the design of contemporary gear shapers discussed above. First, contemporary stroke drive design presents several problems. Separate additional motors and axes of control are required throughout the crankshaft linkage between the motor and the spindle to adjust stroke position and stroke length. Additionally, backlash is inherently present in crankshaft type linkages, and must be compensated for.

Second, due to the static placement of the motor of the rotary drive, a lead guide is ordinarily required to maintain the straightness of the spindle during the rotation thereof as the spindle reciprocates. Even in more contemporary CNC systems, some type of lead guide is still required to maintain the straightness of the spindle and transmit the rotational motion and force from the rotary drive. The lead guide is essentially a sliding joint between the statically mounted rotary motor, the linkage extending therefrom, and the spindle.

Third, as noted above, the spindle continuously rotates as it reciprocates. The spindle also backs away from the workpiece in a back-off stroke prior to the return stroke. However, the spindle, and more particularly the cutting gear attached to the spindle, can interfere with a trailing flank of the workpiece during the return stroke despite the back-off stroke causing a condition known as rub. Rub is a function of the continuous rotary feed rate of the cutting gear and the workpiece, as well as workpiece and cutting gear geometries.

In view of the above, it is therefore desirable to have a cutting machine for gear shaping that alleviates one or more of the above noted deficiencies currently in the art and/or that provides other advantages or features.

BRIEF SUMMARY OF THE INVENTION

The present invention is directed toward a cutting machine that has several different inventive aspects that may be employed independently or in combination. Some aspects are summarized below while others may be developed in the remainder of the disclosure.

In one inventive aspect, a gear shaping machine uses a linear motor to reciprocate a ram along a stroke axis. In some embodiments, stroke position, stroke speed, and stroke length may be controlled over a single axis as opposed to multiple axes. The gear shaping machine includes a saddle and a linear guide mounted to the saddle defining a shaping axis. A ram carrying a spindle is slidable on the linear guide along the shaping axis. The gear shaping machine further includes at least one linear motor supported by the saddle and acting on the ram, the at least one linear motor operable to reciprocate the ram and the spindle back and forth along the shaping axis in unison relative to the saddle.

In another one of the inventive aspects, a gear shaping machine that includes a reciprocating ram that carries and reciprocates a rotary drive and a spindle directly driven by the rotary drive. In some embodiments, no additional lead guides or linkages are required to maintain the straightness of the spindle. The gear shaping machine includes a support structure and a gear shaping head carried by the support structure. The gear shaping head has a ram movable relative to the support structure. The ram carries a spindle and a rotary drive. The rotary drive is operably connected to the spindle to impart a torque to the spindle. The spindle and the rotary drive reciprocate together with the ram and relative to the support structure.

In yet another one of the inventive aspects, a method for shaping a blank into a gear with a gear shaping machine using a timed stepped rotary feed is provided. In some embodiments, the incidence of rub is reduced or eliminated by using a timed stepped rotary feed. The method includes cutting a portion of the blank during a cutting stroke with a tool operably connected to a spindle of the gear shaping machine wherein the spindle travels from a first position to a second position during the cutting stroke. The cutting stroke occurs along a stroke axis. The method further includes returning the spindle to the first position during a return stroke, also occurring along the stroke axis. After completion of the return stroke, the method further includes indexing the spindle from a first angular position to a second angular position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
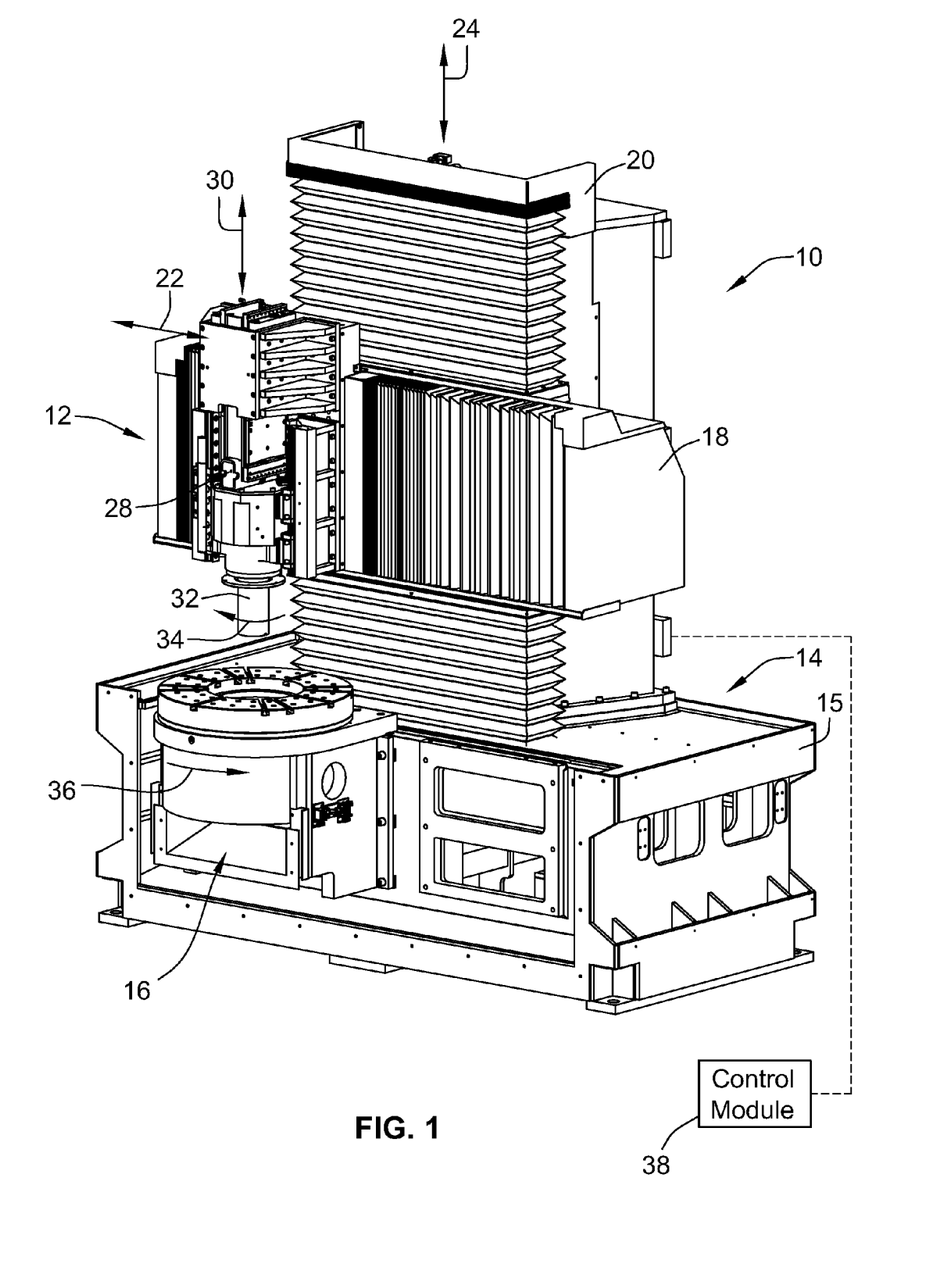
FIG. 1 is a perspective view of an embodiment of a cutting machine of the present invention.

Turning now to the drawings, there is illustrated in FIG. 1 a cutting machine 10. The cutting machine 10 has a gear shaping head 12 mounted to a support structure 14. The gear shaping head 12 incorporates a stroke drive and a rotary drive to facilitate the gear shaping process discussed in the following. A work table 16 is situated below the gear shaping head 12 and mounted to the support structure 14.

While the following description will utilize such an exemplary environment in describing various features and functionality of embodiments of the present invention, such description should be taken by way of example and not by way of limitation. Indeed, while the gear shaping head 12 is shown integrated with the support structure 14 and work table 16 illustrated in FIG. 1, it is recognized that the gear shaping 12 can be supplied as a stand alone product to be retrofit on existing support structures. Additionally, it is recognized that the embodiments disclosed are not limited to shaping gears alone, but can also shape splines or other shapes as well. Accordingly, the term "gear shaping" is not meant to limit embodiments of the invention to operating upon gears alone, as other structures are contemplated.

The support structure 14 has a base 15, a lateral support member 18, and a vertical support member 20. The lateral support member 18 supports and carries the gear shaping head 12, while the vertical support member 20 supports and carries the lateral support member 18. The gear shaping head 12 moves laterally relative to the work table 16 along a lateral infeed axis 22 on the lateral support member 18. The gear shaping head 12 and lateral support member 18 move relative to the work table 16 along a stroke position axis 24 on the vertical support member 20. Those skilled in the art will recognize that the gear shaping head 12 moves laterally along the lateral infeed axis 22 and vertically along the stroke position axis 24 to accommodate varies types and sizes of work mounted on the work table 16. As will be discussed in greater detail later on, the gear shaping head 12 moves along the infeed axis 22 to avoid unwanted interference with work mounted upon the work table 16 during a stroke cycle.

Figure 2:
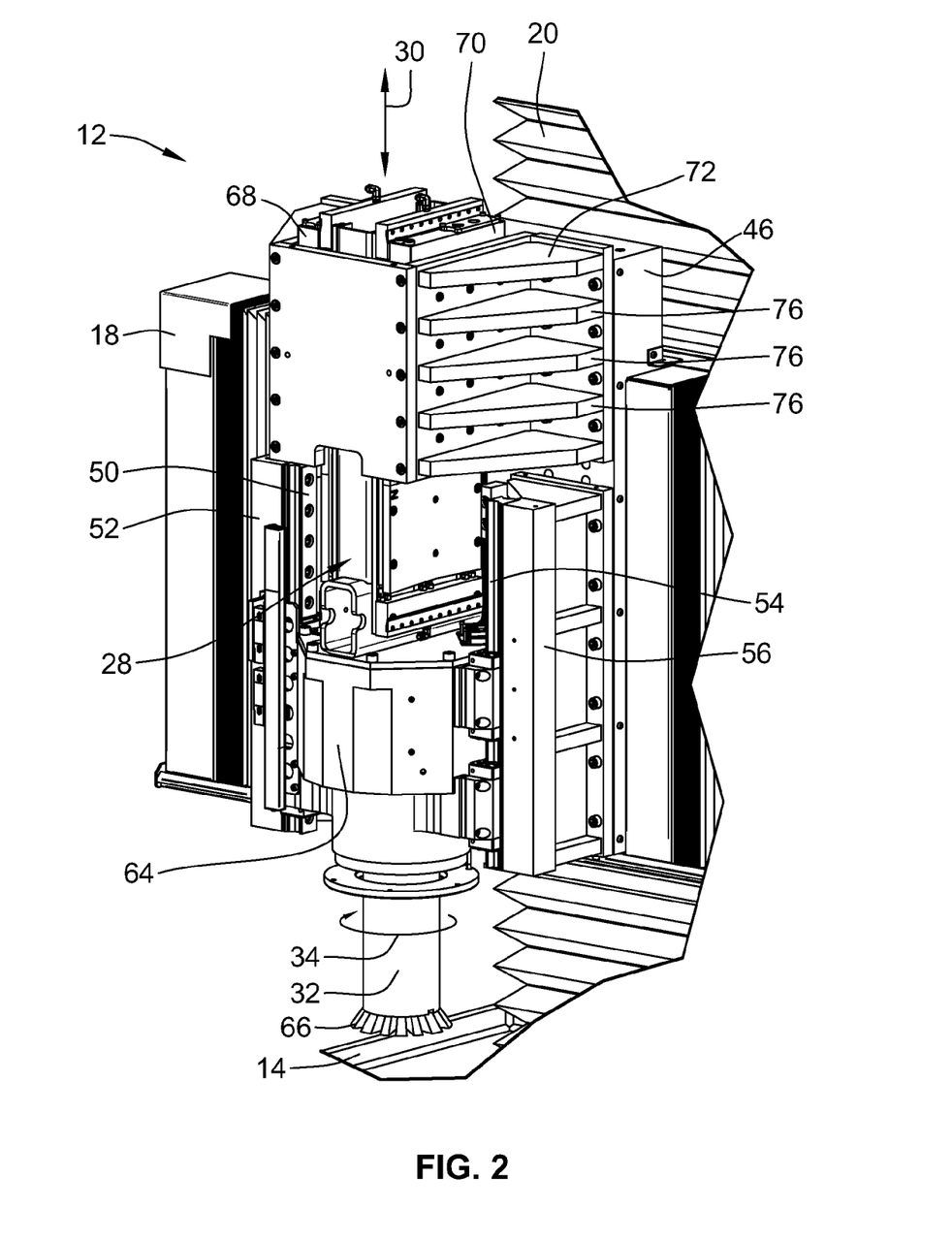
FIG. 2 is a perspective view of a gear shaping head of the embodiment of the cutting machine of FIG. 1.

Turning now to FIG. 2, an embodiment of the gear shaping head 12 is illustrated. The gear shaping head includes a ram 28, a linear guide arrangement (see e.g. guide rails 50, 54, and bearing blocks 96, 100, 118 of FIG. 6) for guiding the ram 28, and a motor mount structure 72 carrying a pair of linear motors 68, 70 that drive the ram 28, and a rotary drive 62 (see FIG. 4) and a spindle 32 carried by the ram 28 in a reciprocating motion. The gear shaping head 12 has a saddle 46, i.e. a base plate, that portions of the linear guide arrangement and motor mount structure 72 mount to. The saddle 46 is connected to the lateral support member 18, and thereby serves as the union between the gear shaping head 12 and the remainder of the cutting machine 10.

As will be discussed in greater detail later on, the linear guide arrangement guides the ram 28 as the ram 28 linearly reciprocates along the stroke axis 30 relative to the saddle 46 of the gear shaping head 12. The term "linear guide arrangement" is not intended to be limiting to a single structure. Instead, and as will be more fully appreciated by the following, the linear guide arrangement can generally include a combination of guide rails and bearing blocks mounted at various locations within the gear shaping head 12, but is not limited to these particular structures. Indeed, other guidance systems are contemplated.

Figure 3:
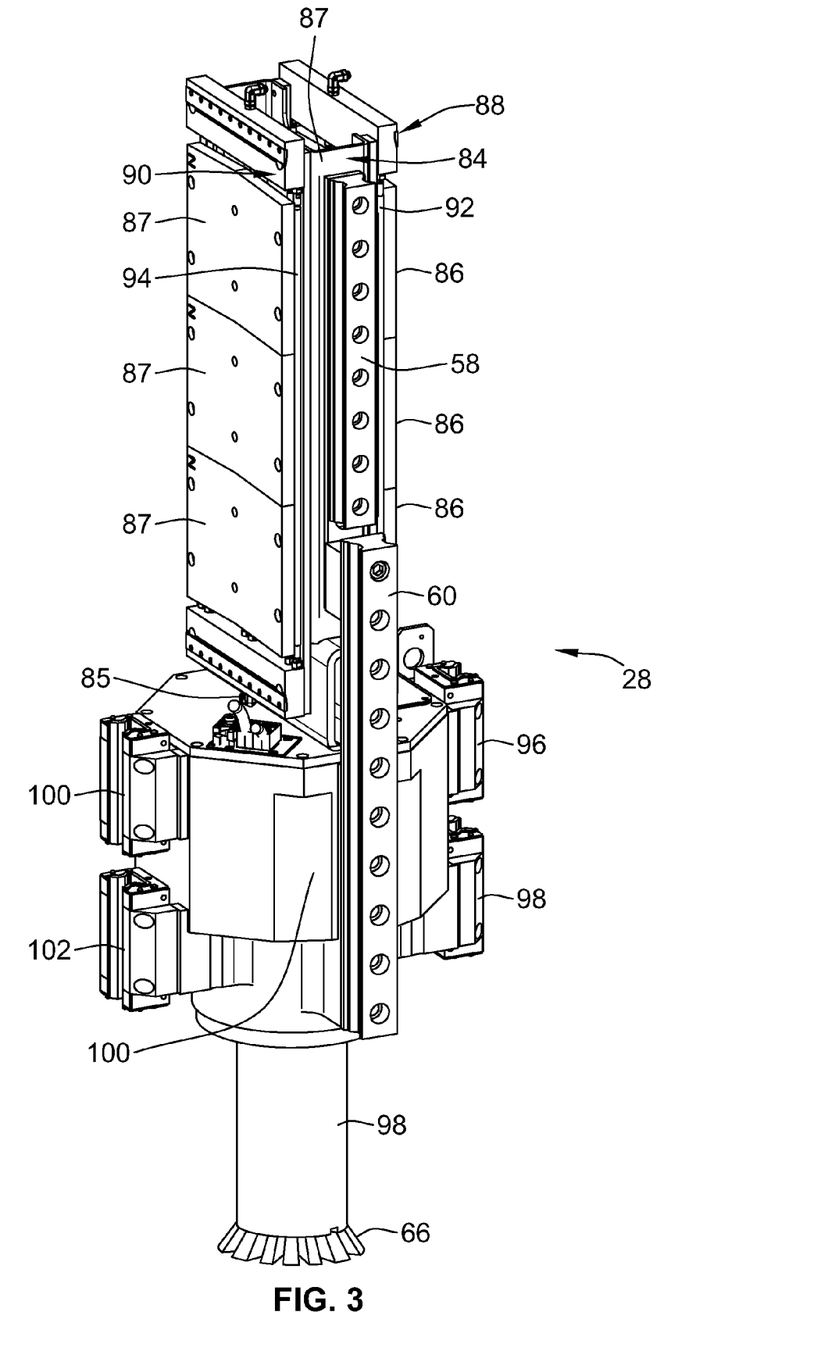
FIG. 3 is a perspective view of a ram of the gear shaping head of FIG. 2.

With reference to FIG. 3, the ram 28 is illustrated as having a generally longitudinal shape. The ram 28 has a support frame 84 that supports a rotary drive 62 (see FIG. 4) carried within a rotary drive housing 64 as well as a spindle 32. The support frame 84 and rotary drive housing 64 provide structural rigidity to the ram 28 and also allow for the mounting of components of the stroke drive and the linear guide arrangement. It will be recognized that the ram 28 is not limited by the particular stroke drive and linear guide arrangement components mounted thereto as illustrated and discussed, and indeed other combinations are contemplated.

In the illustrated embodiment of FIG. 3, the support frame 84 extends between a bottom end 85 and a top end 87 and carries first and second pluralities of rectangular magnets 86, 87 associated with a first and second linear motor 68, 70 (see FIG. 2) respectively, and together form the stroke drive of the gear shaping head 12. The first and second pluralities of magnets 86, 87 are arranged in an opposed spaced relationship on the support frame 84. It is an advantage that the opposed spaced relationship of the first and second pluralities of magnets 86, 87 allows for the cancellation of some of the magnetic forces generated thereby. As a result, the mechanical stresses that would otherwise be experienced by the remainder of the gear shaping machine 12 as a result of the magnetic forces are reduced and/or eliminated entirely. Indeed, and as will be developed more fully below, the first and second pluralities of magnets 86, 87 and the first and second linear motors 68, 70 (see FIG. 4) are arranged symmetrically, and in a reciprocally cancelling arrangement, to reduce and/or eliminate the magnetic forces generated thereby.

The support frame 84 also carries first and second cooling systems 88, 90 on either side thereof. The first cooling system 88 includes cooling lines 92 that circulate coolant about the inner-most surfaces of the first plurality of magnets 86. The second cooling system 90 includes cooling lines 94 that circulate coolant about the inner-most surfaces of the second plurality of magnets 87. It is understood that the first and second cooling systems 88, 90 can be air cooled or liquid cooled systems.

As noted above, and as will be discussed in greater detail later on, the ram 28 carries a rotary drive 62 (see FIG. 4) enclosed in a rotary drive housing 64. The rotary drive housing 64 is mounted to the bottom end 85 of the support frame 84, and generally encloses the rotary drive 62 and a portion of a spindle 32 also carried by the ram 28. Similar to the support frame 84, various components of the linear guide arrangement are mounted to the rotary drive housing 64.

A first set of bearing blocks 96, 98 and a second set of bearing blocks 100, 102 are mounted to the rotary drive housing 64, and each form a portion of the linear guide arrangement. As will be discussed in greater detail later on, the first set of bearing blocks 96, 98 receive and linearly glide upon a first guiderail 50 (see FIG. 2) of the linear guide arrangement. The second set of bearing blocks 100, 102 receive and glide upon on a second guiderail 52 (see FIG. 2) of the linear guide arrangement. The first and second guiderails 50, 52 (see FIG. 2) and their respective first bearing blocks 96, 98 and second bearing blocks 100, 102 allow the ram 28 along with the spindle 32 and rotary drive 62 (not shown) to linearly reciprocate along the stroke axis 30 (see FIG. 2) in a highly accurate and precise manner.

The first set of bearing blocks 96, 98 and the second set of bearing blocks 100, 102 are mounted generally to the rotary drive housing 64. However, in other embodiments, the first set of bearing blocks 96, 98 and second set of bearing blocks 100, 102 can be mounted elsewhere, e.g. to the support frame 84 of the ram 28. Although illustrated as using two bearing blocks 96, 98 in other embodiments a single bearing block, or more than two bearing blocks can be used. It is recognized, however, that by using multiple bearing blocks a more precise and accurate reciprocating motion is achieved.

An inner and an outer guide rail 58, 60 are mounted to the support frame 84 and the rotary drive housing 64, and form a part of the linear guide arrangement. As will be explained in greater detail below, the inner guide rail 58 is received by a saddle bearing block 118 mounted to the saddle 46 (see FIG. 5), and the outer guide rail 60 is received by a linear brake also mounted to the saddle 46 (see FIG. 6).

Figure 4:
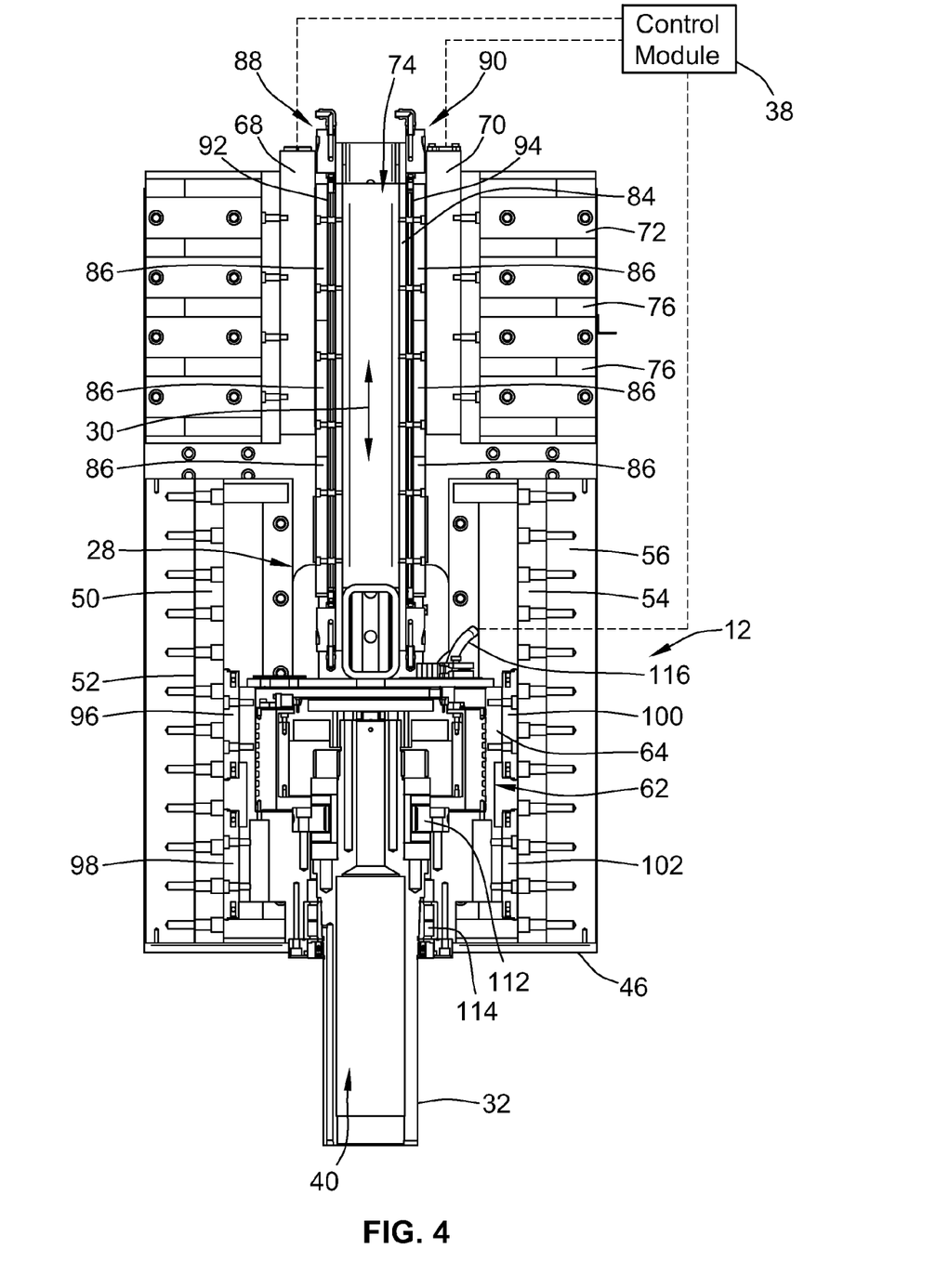
FIG. 4 is a front cross section of the gear shaping head of FIG. 2.

Turning now to FIG. 4, a more detailed view of the ram 28 in relation to the remainder of the gear shaping head 12 is illustrated. As stated above, the ram 28 carries a spindle 32 and linearly reciprocates along a stroke axis 30 relative to the saddle 46. The first and second linear motors 68, 70 are responsible for providing the reciprocating force necessary to accomplish this functionality. The first and second linear motors 68, 70 are mounted to a motor mount structure 72 that is in turn mounted to the saddle 46. The first linear motors 68 operates upon the first plurality of magnets 86 and the second linear motor 70 operates upon the second plurality of magnets to provide the magnetic driving force required to linearly reciprocate the ram 28 during operation.

The motor mount structure 72 has opening 74 that allows the ram 28 to pass therethrough as the ram 28 reciprocates along the stroke axis 30. The first and the second linear motors 68, 70 are carried by the motor mount structure 72 such that they are on either side of the ram 28, and particularly on either side of the first and second pluralities of magnets 86, 87, respectively.

It will be recognized that a relative large amount of heat is generated due to the reciprocation of the ram 28. As a result, the motor mount structure 72 incorporates a plurality of fins 76 to dissipate heat energy generated by the first and second linear motors 68, 70. Additionally, the first and second cooling systems 88, 90 circulate fluid through their respective cooling lines 92, 94 to remove heat transferred to the magnets during operation. As a result, the gear shaping head 12 maintains a relatively cool operating temperature during the gear shaping process.

Each of the first and second linear motors 68, 70 are in electronic communication with a control module 38. The control module 38 is operable to govern the input power signal sent to the first and second linear motors 68, 70 to manipulate the speed and length of stroke along the stroke axis 30. As discussed above, this functionality allows for the efficient and simple control of multiple machining parameters of the gear shaping process, e.g. stroke position, stroke length, stroke speed, etc., by controlling a single input, e.g. the input power, as opposed to controlling multiple inputs axes and linkages in more complex stroke drive systems.

Although illustrated as incorporating first and second linear motors 68, 70 in an opposed space relationship, the gear shaping head 12 can utilize a single linear motor and achieve the benefits discussed herein. However, two or more motors are preferred as the opposed space relationship of the linear motors 68, 70 allows for a more balanced driving load exerted by the stroke drive onto the ram 28. Additionally, those skilled in the art will also recognize that by using two linear motors 68, 70 the more complex linkages of rotary-to-linear stoke drives are avoided. Indeed, the first and second linear motors 68, 70 allows for the adjustment of various machining parameters such as stroke position, stroke length, stroke speed, etc. along a single axis, i.e. the stroke axis 30, as opposed to multiple axes as is the case in rotary-to-linear stroke drive assemblies.

As the ram 28 reciprocates, it is guided by the linear guide arrangement, and particularly by first and second guiderails 50, 54 each respectively mounted on first and second guiderail supports 52, 56. The first and second guide rail supports 52, 56 are fixedly mounted to the saddle 46, and extend outwardly therefrom. As a result, the first and second guiderails 50, 54 maintain a fixed position relative to the saddle 46 while the ram 28 reciprocates relative thereto.

Figure 5:
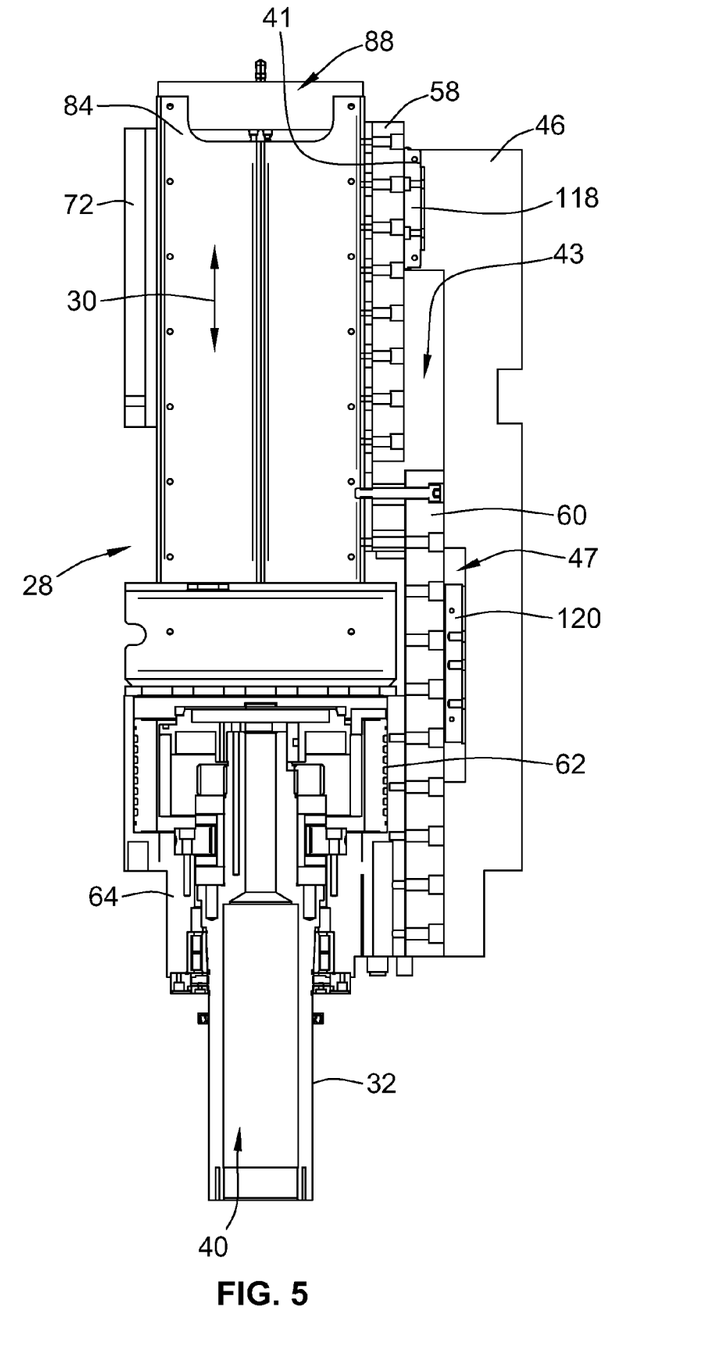
FIG. 5 is a side cross section of the gear shaping head of FIG. 2.

Turning now to FIG. 5, the ram 28 is also guided by the inner and outer guiderails 58, 60 (see FIG. 3) that are received by a saddle bearing block 118 and a linear motion brake 120 respectively. Together the first and second guiderails 50, 54 (see FIG. 4), and the inner and outer guiderails 58, 60 linearly guide the ram 28 relative to the saddle 46 and maintain fidelity of motion during reciprocation along the stroke axis 30. The saddle bearing block 118 extends from an outer surface 41 of the saddle 46, and is generally similar in form to each bearing block of the first and second sets of bearing blocks 96, 98, 100, 102. The outer guiderail 60 slides within a first cavity 43 of the saddle 46, and is slidably connected to the linear motion brake 120 which is contained in a second cavity 47 of the saddle.

Figure 6:
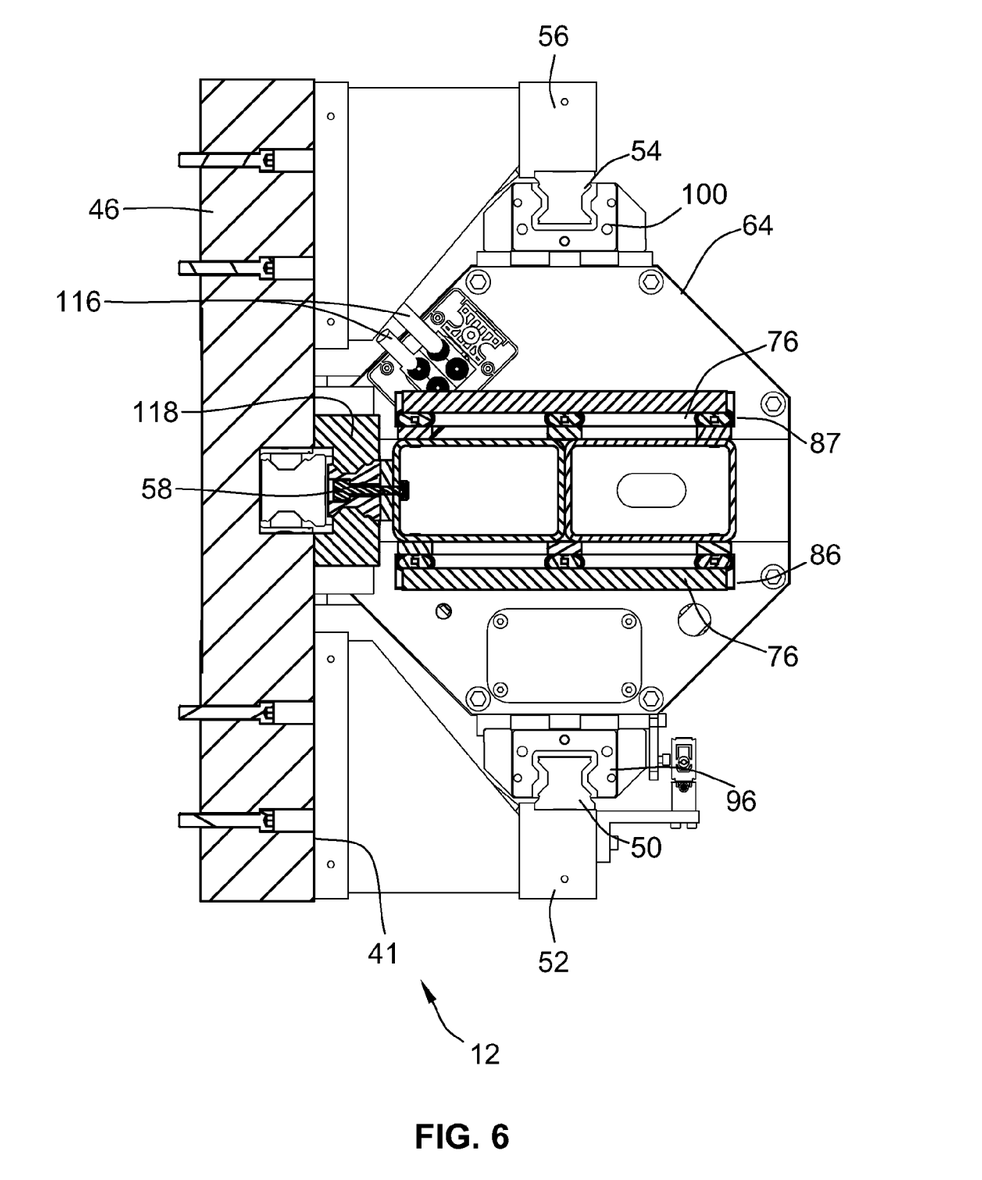
FIG. 6 is a top cross section view of the gear shaping head of FIG. 2.

With reference now to FIG. 6, a portion of an embodiment of the linear guide arrangement is illustrated. As illustrated, the saddle bearing block 118 receives the inner guiderail 58 carried by the support frame 84 of the ram 28. In a similar manner, the first set of bearing blocks 96, 98 (bearing block 98 not shown in FIG. 6) receive the first guiderail 50, and the second set of bearing blocks 100, 102 (bearing block 102 not shown in FIG. 6) receive the second guiderail 54. The saddle bearing block 118 and inner guiderail 58 are in an opposite configuration of the first and second guiderails 50, 54 and first and second sets of bearing blocks, 96, 98, 100, 102. Put another way, unlike the first set of bearing blocks 96, 98 and second set of bearing blocks 100, 102, the saddle bearing block 118 remains fixed relative to the saddle 46 while the inner guiderail 58 linearly reciprocates therethrough.

The first set of bearing blocks 96, 98 remain fixed relative to the ram 28, and slide along the first guiderail 50. Similarly, the second set of bearing blocks 100, 102 remain fixed relative to the ram 28, and slide along the second guiderail 54. The first set of bearing blocks 96, 98 and second set of bearing blocks 100, 102 in combination with their respective corresponding guiderails 50, 54 as well as the saddle bearing block 118 in combination with the inner guiderail 54 radially constrain the ram 28, such that generally only linear motion of the same is allowed relative to the saddle 46. Although each of the guiderails 50, 54, 58 are illustrated with a particular outer periphery that corresponds to a particular inner periphery of their respective bearing blocks, 96, 98, 100, 102, 118, it is recognized that various corresponding guiderail and bearing block peripheries are contemplated.

Figure 7:
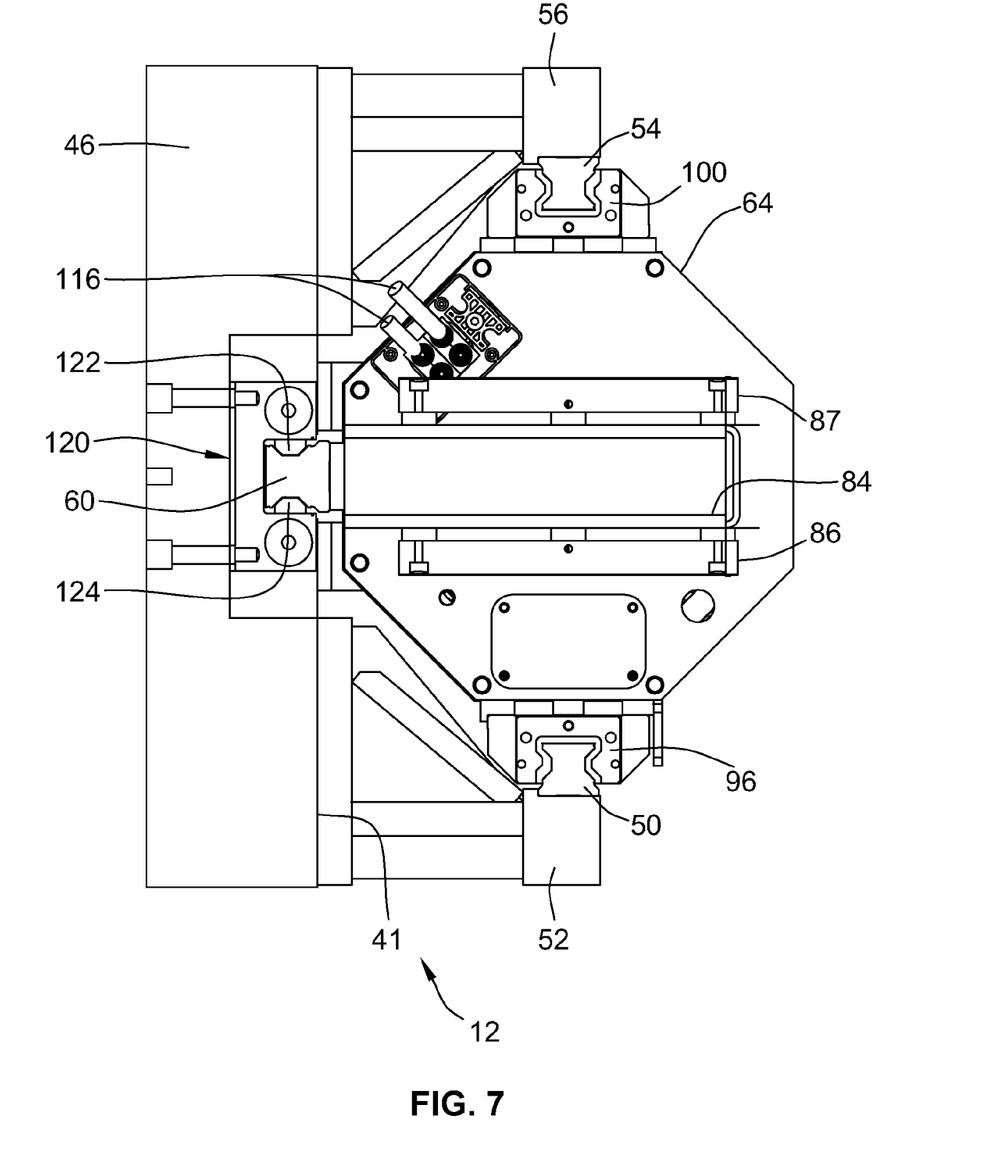
FIG. 7 is a further top cross section view of the gear shaping head of FIG. 2.

With reference now to FIG. 7, a linear motion brake 120 is mounted in a second cavity 47 of the saddle 46, and extends outward into a first cavity 45. The linear motion brake 120 functions similar to the saddle bearing block 118 (not shown) in that it allows the outer guiderail 60 to linearly slide therethrough during normal operation of the gear shaping head 12. The linear motion brake 120 has a pair of brake pads 122, 124. The linear motion brake 120 can stop or prevent the further reciprocation of the ram 28 relative to the saddle 46 by forcing the brake pads 122, 124 toward the outer guiderail 60 in such a way as to prevent movement of the outer guiderail 60 relative to the linear motion brake 120.

The linear motion brake 120 can initiate this process under various conditions. For example, the linear motion brake 120 can operate upon the outer guiderail 60 to prevent further motion of the outer guiderail 60 relative to the linear motion brake 120 in the event that there is a power failure. In the event of a power failure, the linear motion brake 120 will immediately lockdown upon the guiderail 60 by way of the brake pads 122, 124 to prevent the ram 28, rotary drive 62, and spindle 32 from crashing into the work table 16 (see FIG. 1). In other embodiments, the linear motion brake 120 can operate upon the guiderail 60 as described above under other conditions.

Figure 8:
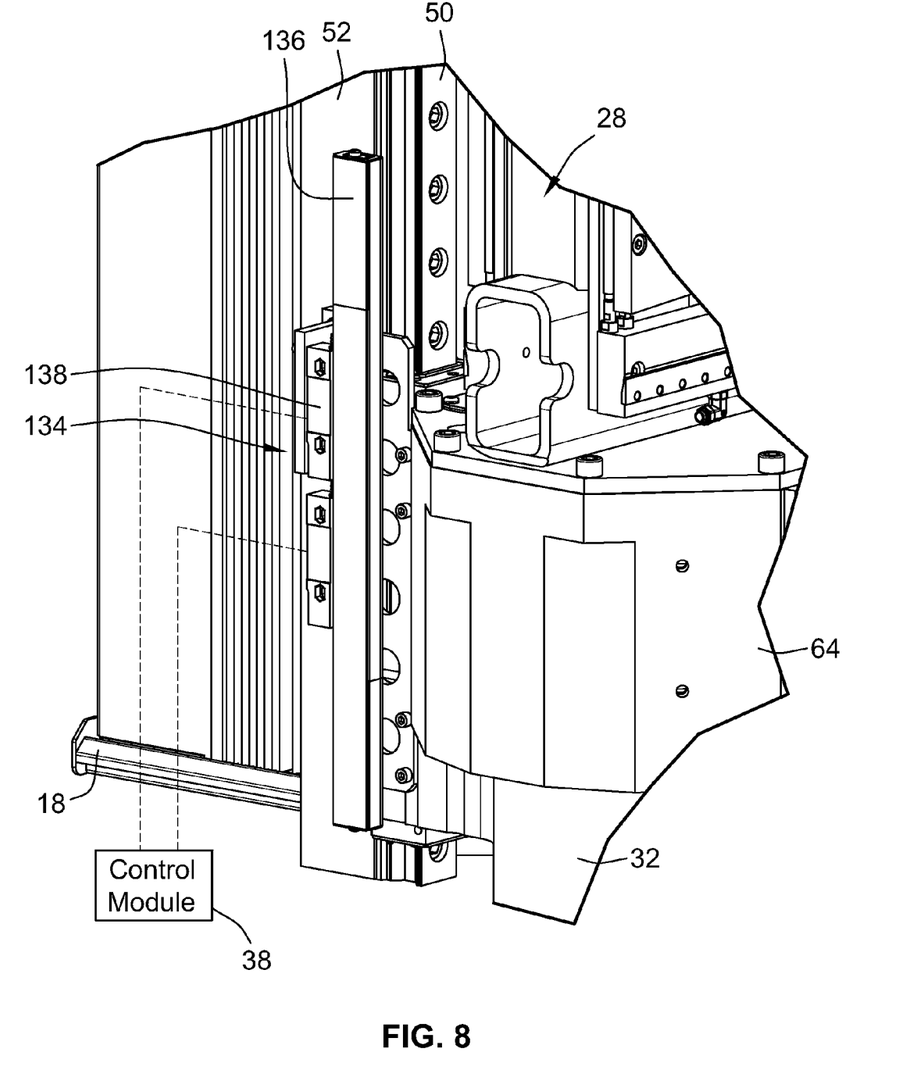
FIG. 8 is a partial perspective view of a linear encoder system of the gear shaping head of FIG. 2.

Turning now to FIG. 8, the control module 38 is in electronic communication with a linear encoder system 134. The linear encoder system 134 provides closed loop position feedback control indicating a precise linear position of the ram 28 and thereby the spindle 32 carried by the ram 28. The linear encoder system 134 includes a linear scale 136 and a reader head 138. The reader head 138 is mounted to one of the guiderail supports 52 while the linear scale 136 moves with the ram 28 and is mounted to the rotary drive housing 64.

In operation, as the ram 28 moves, the linear scale 136 will mover therewith. The reader head 138, which remains fixed to the guiderail support 54, will read the linear scale 136. The control module 38 receives the information collected by the reader head 138 and determines the corresponding linear position along the stroke axis 30, see FIG. 1, of the ram 28, rotary drive 62 and spindle 32. Of course, the components of the linear encoder system 134 can be reversed such that the linear scale 136 remains fixed to the guiderail support 52 and the reader head 138 moves with the ram 28 and is carried thereby. The control module 38 uses the information collected by the linear encoder system 134 to provide closed loop control of stroke speed, stroke position, and stroke length of the ram 28 relative to the saddle 46 (see FIG. 4). This arrangement further facilitates the benefits and advantages of single axis control, i.e. single stroke axis 30 control, as discussed above.

Figure 9:
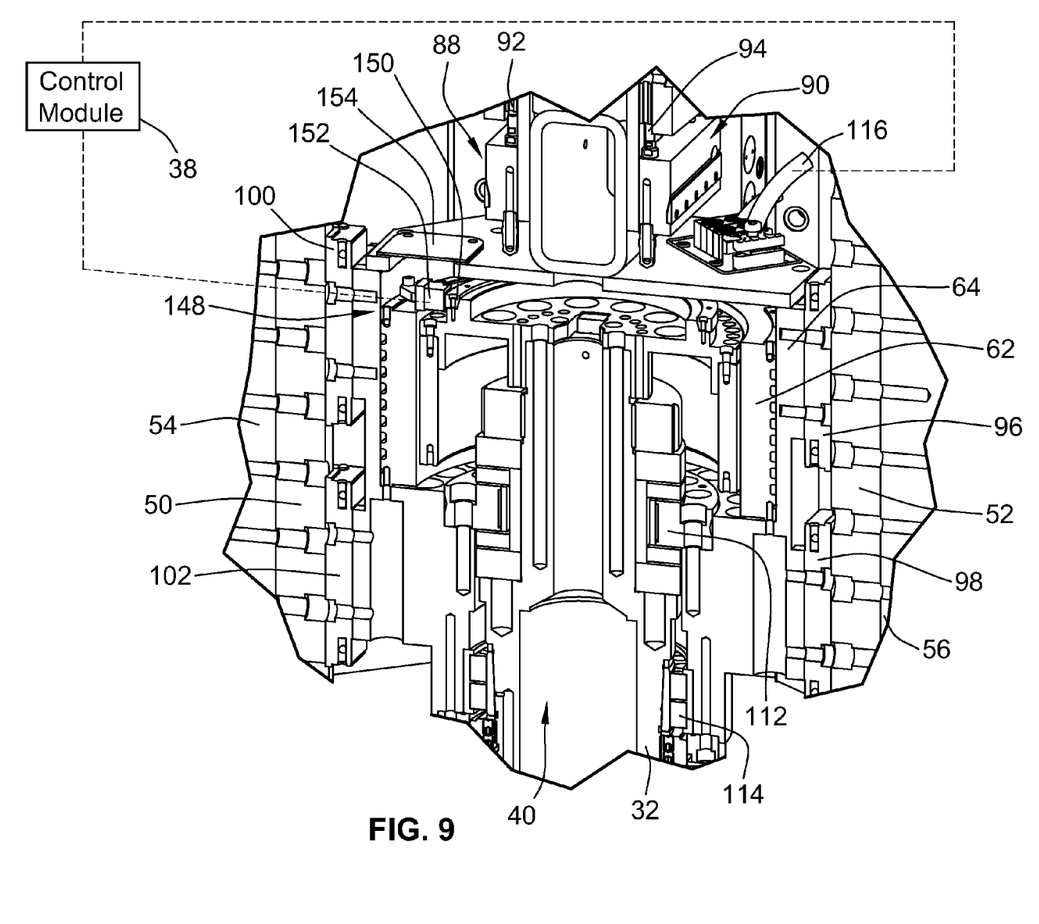
FIG. 9 is a partial cross section a rotary drive of the ram of FIG. 3.

With reference to FIG. 9, the rotary drive 62 is illustrated enclosed within the rotary drive housing 64. The rotary drive 62 is responsible for rotating the spindle 32 in the spindle rotary feed direction 34 (see FIG. 1). More specifically, the rotary drive 62 is responsible for rotating a cutting tool 66 (see FIG. 2) attached the end of the spindle 32 in the spindle rotary feed direction 34. As will be discussed in greater detail later on, the rotary drive 62 is in a direct drive relationship with the spindle 32 and reciprocates along the stroke axis 30 with the ram 28 and the spindle 32. Due in part to this direct drive relationship, it is not necessary to incorporate lead guides to maintain the straightness of the spindle 32 during rotation in the spindle rotary feed direction 34 (see FIG. 1). In the illustrated embodiment, the rotary drive 62 is a torque motor. However, in other embodiments, other rotational drive systems are contemplated.

The spindle 32 is received by the rotary drive 62. Those skilled in the art will recognize that the spindle 32 is in a direct drive relationship with the rotary drive 62. An upper spindle support bearing 112 and a lower spindle support bearing 114 support the spindle 32 relative to the rotary drive 62 and allow for the smooth, low friction operation of the spindle 32. The spindle 32 has a central cavity 40 for receipt of a cutting tool 66 (see FIG. 2) tool holder.

A set of rotary drive power leads 116 extend from the rotary drive 62 through the rotary drive housing 64 and are in electronic communication with the control module 38. The control module 38 is operable to govern an input power signal to the rotary drive motor to ultimately govern the rotation of the spindle 32.

A rotary encoder system 148 is in electronic communication with the control module 38. The rotary encoder system 148 provides positional information regarding the angular position of the rotary drive 62 and more particularly the spindle 32 directly coupled to the rotary drive 62. The rotary encoder system 148 includes a rotary scale 150 and a rotary reader head 152. The rotary scale 150 rotates with the rotary drive 62. The rotary reader head 152 remains statically mounted to the rotary drive 62. As the rotary scale 150 rotates relative to the rotary reader head 152, the rotary reader head 152 collects positional information of the rotary scale 150 and more particularly of positional information of the rotary drive 62 and spindle 32.

The rotary encoder system 148 sends the positional information collected to the control module 38. The control module 38, in turn, provides closed loop control of the rotary drive 62. More particularly, the control module 38 is operable to send a signal to the rotary drive 62 to journal it to a desired angular position relative to the work table 16 (see FIG. 1).

The rotary drive housing 64 also includes a reader head access panel 154. The reader head access panel 154 can be removed from the rotary drive housing 64 to allow for the maintenance and replacement of the rotary reader head 152. Of course, as was the case with the linear encoder system 134 (see FIG. 8), the rotary scale 150 and rotary reader head 152 can be reversed such that the rotary scale 150 remains fixed within the rotary drive 62 while the rotary reader head 152 rotates with the rotary drive 62 and relative to the rotary scale 150.

Having discussed the various structural attributes of embodiments of the cutting machine 10, the following provides a description of various stages of a gear shaping stroke of the gear shaping machine 10.

Figure 10:
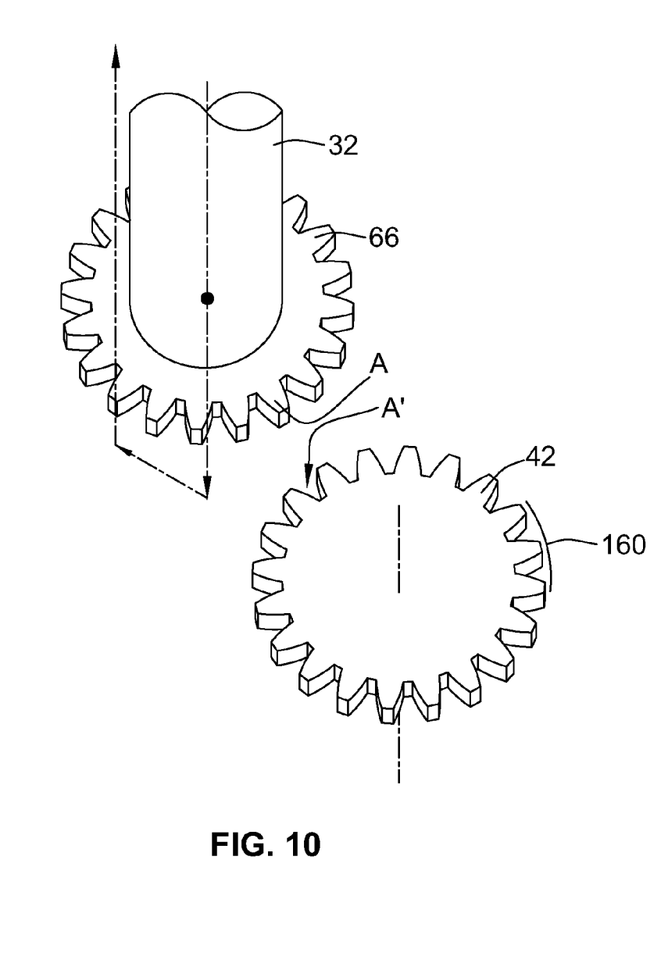
FIG. 10-13 are perspective views of a spindle and a workpiece of the cutting machine of FIG. 1 during various stages of a cutting stroke.

As will be discussed in greater detail later on, the rotary drive 62 utilizes a time stepped rotary feed to rotate the spindle 32, as opposed to continuous rotation. With reference now to FIG. 10, the spindle 32 is illustrated carrying a cutting tool 66. As discussed above, the spindle 32 and cutting tool 66 linearly reciprocate relative to a workpiece 42 to generate a tooth profile 160. For purposes of description, one tooth of the cutting tool 66 has been label tooth A. Similarly on flute of the workpiece 42 has been labeled A'. The spindle 32 and cutting tool 66 are illustrated at the beginning of a typical gear shaping stroke. When this is so, the spindle 32 and cutting tool 66 are vertically above the workpiece 42.

Figure 11:
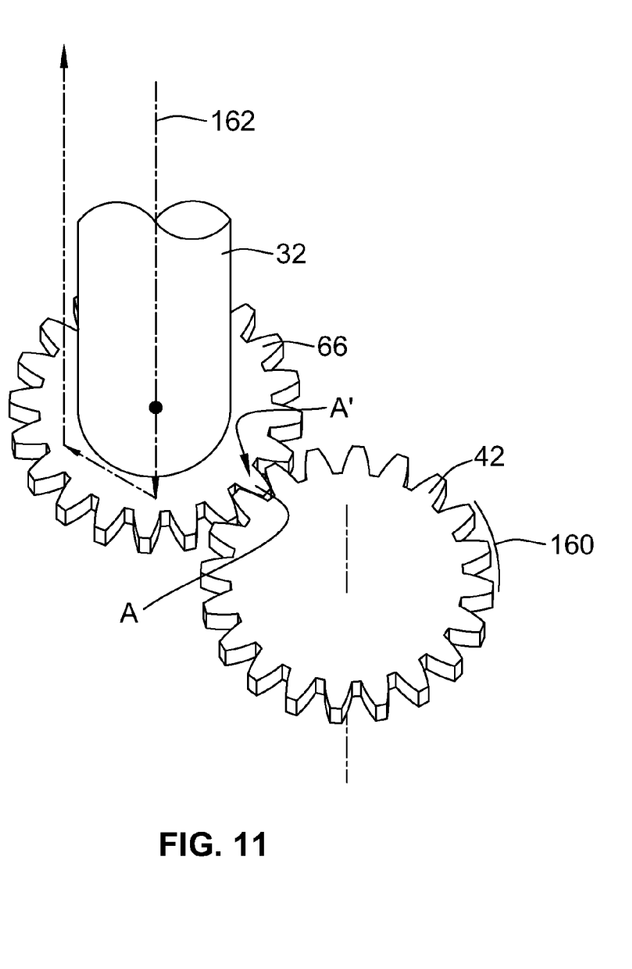

Turning now to FIG. 11, the first stage of a gear shaping stroke is the cutting stroke. During the cutting stroke, the linear motors 68, 70 operate upon the first and second pluralities of linear motor magnets 86, 87, respectively, to drive the ram 28, and accordingly the spindle 32 carried thereby, toward the workpiece 42 until tooth A and adjacent teeth of the cutting gear engage flute A' and the adjacent flutes of the workpiece 42 to perform a cut on the outer periphery thereof.

Once the cutting tool 66 completes the cut upon the tooth profile 160 of the workpiece 42 the linear motor 68, 70 rapidly decelerate and subsequently stop further negative displacement in the cutting direction 162 of the spindle 32 and cutting tool 66. Once the spindle 32 and cutting tool 66 are at a position below the workpiece 42 the cutting stroke is complete.

Figure 12:
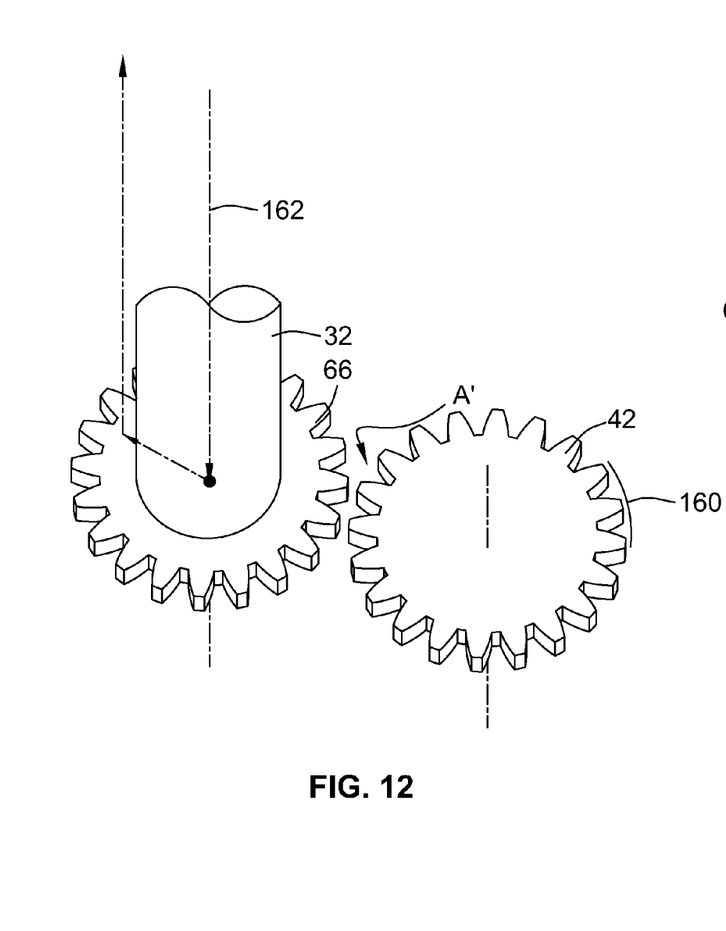

Turning now to FIG. 12, once the cutting stroke is complete, the entire gear shaping head 12 backs away from the workpiece 42 along the lateral infeed axis 22 in a radial back off direction 164. The gear shaping head 12 is backed away from the workpiece 42 by a linear drive mechanism, e.g. ball screw drive, carried by the lateral support member 18 (see FIG. 1). Once the spindle 32 and cutting tool 66 have sufficiently backed away along the lateral infeed axis 22 in the radial back off direction 164 the linear motors 68, 70 then initiate the return stroke process.

Figure 13:
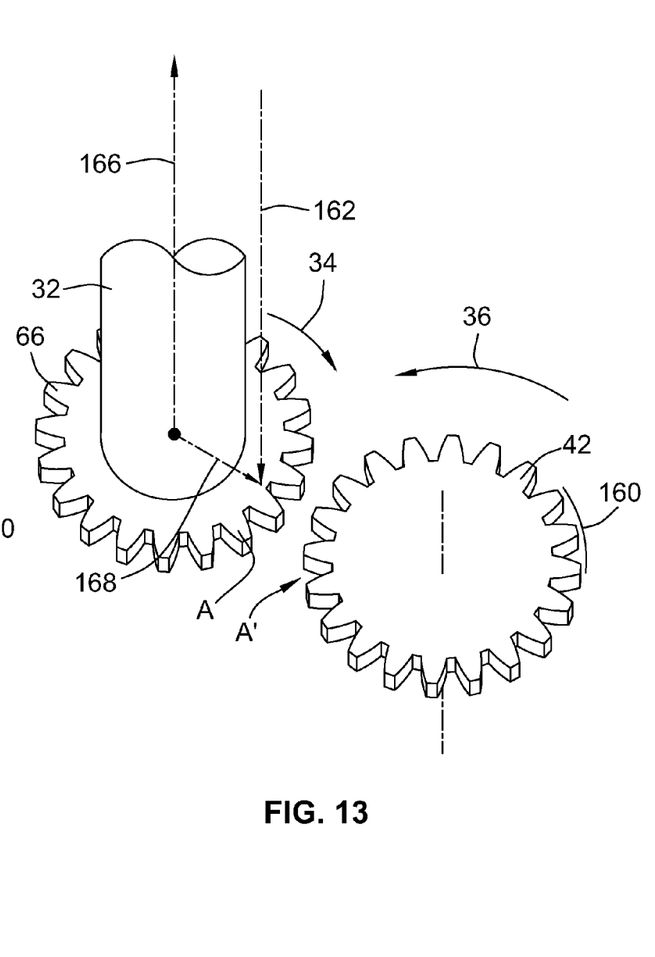

With reference now to FIG. 13, during the return stroke, the linear motor 68, 70 return the spindle 32 and cutting tool 66 along the stroke axis 30 in a return direction 166 to the same position that the spindle 32 and cutting tool 66 start the cutting stroke at (see FIG. 10). Before beginning another cutting stroke, the rotary drive 62 journals the spindle 32 and cutting tool 66 in the spindle rotary speed direction 34 such that tooth A is at an angular position different than that illustrated in FIGS. 10-12. Similarly, when the spindle 32 and cutting tool 66 are at the top of the return stroke 166, the work table 16 journals the workpiece 42 such that the flute A' is at an angular position different from that illustrated in FIGS. 10-12. One advantage to waiting to journal the spindle 32 and cutting tool 66 in the spindle rotary feed direction 34 and the workpiece 42 in the work table rotary feed direction 36 is that the tendency for the cutting tool 66 to engage the trailing flank of the workpiece 42 during the return stroke is reduced or in some embodiments avoided completely.

Once the spindle 32 and cutting tool 66 have journaled in the spindle rotary feed direction 34 and the workpiece 42 has journaled in the work table rotary feed direction 36, the gear shaping head 12 is then returned along the radial infeed axis 22 in the radial feed direction 168 illustrated in FIG. 13. This completes one gear shaping stroke. However, in other embodiments, the spindle 32 and cutting tool 66 can be returned along the lateral infeed axis 22 in direction 168 before the cutting tool 66 and workpiece 42 are journaled to a new angular position as discussed above.

It will be understood from the above that a similar operation occurs when shaping a workpiece 42 having an interior tooth profile on an inner periphery thereof as opposed to an outer periphery. Additionally, the gear shaping machine 10 can be configured to perform a cut on the workpiece 42 in the cutting stroke and the return stroke. Such a configuration is particularly advantageous when shaping a shaft having multiple tooth profiles thereon.

Figure 14:
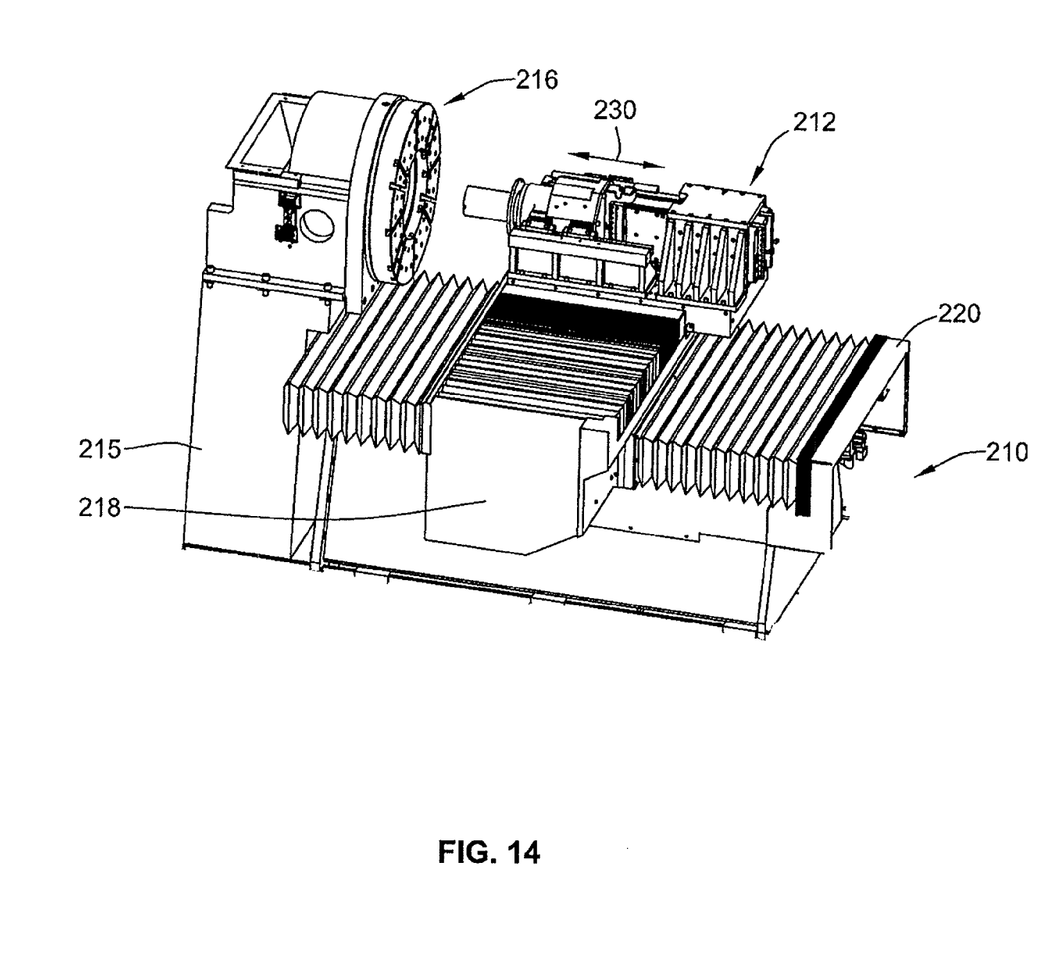
FIG. 14 is a perspective view of another embodiment of a cutting machine of the present invention.

Additionally, and as illustrated in FIG. 14, an alternative embodiment of a gear shaping machine 210 can conduct gear shaping operations horizontally as opposed to vertically. In this embodiment, the gear shaping head 212 reciprocates along a horizontal axis 230 to shape a workpiece mounted on the illustrated work table 216. This embodiment functions in a similar manner as discussed above with the exception that shaping is done horizontally instead of vertically.

As discussed herein, the gear cutting machine 10 provides a linear stroke drive arrangement. This linear stroke drive arrangement allows for control of multiple gear shaping machining parameters over a single stroke axis 30. The gear cutting machine 10 incorporates a gear shaping head 12 with a ram 28 that has a rotary drive 62 in a direct drive relationship with a spindle 32. The rotary drive 62 and spindle 32 reciprocate together such that lead guides are no longer required to maintain the straightness of the spindle 32. The gear shaping head 12 incorporates a gear shaping stroke that uses a time stepped rotary feed to journal the cutting tool 66 and workpiece 42 at the top or beginning of a gear shaping stroke such that rub between the cutting tool 66 and workpiece 42 is reduced or completely avoided in certain embodiments.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gear shaping machine, comprising:
   a saddle defining a stroke axis;
   a linear guide arrangement mounted to the saddle;
   a ram slidable on the linear guide arrangement along the stroke axis;
   a spindle carried by the ram; and
   at least one linear motor supported by the saddle and acting on the ram, the at least one linear motor operable to magnetically reciprocate the ram and the spindle back and forth along the stroke axis in unison relative to the saddle such that the magnetic force provided by the at least one linear motor is directly responsible for said reciprocation of the ram and the spindle; and
   wherein the at least one linear motor includes first and second linear motors in opposed spaced relationship and in a first symmetric orientation about the stroke axis, and wherein the ram carries at least one first magnet and at least one second magnet in an opposed spaced relationship and in a second symmetric orientation about the stroke axis; and
   wherein the first and second linear motors are mourned on a motor mourning structure extending away from the saddle, the motor mounting structure having an opening aligned, along the shaping axis, the opening situated vertically above the spindle along the stroke axis such that the stroke axis extends through the opening, the first and second linear motors mounted within the opening, and wherein the ram reciprocates within the opening and is interposed between the first and second linear motors.

2. The gear shaping machine of claim 1 wherein the first linear motor magnetically biases the at least one first magnet and the second linear motor magnetically biases the at least one second magnet to linearly reciprocate the ram along the stroke axis.

3. The gear shaping machine of claim 1 wherein the first and second symmetric orientations are arranged such that a substantial amount of the magnetic force generated by the first and second linear motors and the at least one first magnet and the at least one second magnet are cancelled.

4. The gear shaping machine of claim 1 wherein the ram has a longitudinal center axis, the longitudinal center axis coincident with the stroke axis.

5. The gear shaping machine of claim 1, wherein the linear guide arrangement includes a first and a second guiderail in an opposed spaced relationship, the ram interposed between the first and second guiderails, and wherein the ram includes a first and a second guiderail bearing, wherein the first guiderail bearing is slidable on the first guiderail and the second guiderail bearing is slidable on the second guiderail.

6. The gear shaping machine of claim 5 wherein the first guiderail bearing includes at least one first bearing block, and the second guiderail bearing includes at least one second bearing block, the at least one first bearing block and the at least one second bearing block each slidable along the first and second guiderails, respectively, along the shaping axis.

7. The gear shaping machine of claim 5 wherein the linear guide arrangement further includes a saddle bearing block mounted to the saddle, the saddle bearing block receiving an inner guiderail mounted on the ram.

* * * * *

UNITED STATES PATENT AND TRADEMARK OFFICE
CERTIFICATE OF CORRECTION

| | |
|---|---|
| PATENT NO. | : 8,985,917 B2 |
| APPLICATION NO. | : 12/764701 |
| DATED | : March 24, 2015 |
| INVENTOR(S) | : Loyd L. Koch et al. |

Page 1 of 1

It is certified that error appears in the above-identified patent and that said Letters Patent is hereby corrected as shown below:

In the Claims

In Column 12, line 1, the word "mourned" should be --mounted--

In Column 12, line 2, the word "mourning" should be --mounting--

Signed and Sealed this
Seventh Day of July, 2015

Michelle K. Lee
*Director of the United States Patent and Trademark Office*